(12) United States Patent
Yamada et al.

(10) Patent No.: US 12,269,433 B2
(45) Date of Patent: Apr. 8, 2025

(54) WIPER CONTROL METHOD AND WIPER CONTROL DEVICE

(71) Applicants: MITSUBA Corporation, Gunma (JP); MAZDA MOTOR CORPORATION, Hiroshima (JP)

(72) Inventors: Masahiro Yamada, Gunma (JP); Takeshi Ikeda, Gunma (JP); Narimitsu Kobori, Gunma (JP); Eisuke Iino, Gunma (JP); Minoru Hoshino, Gunma (JP); Keisuke Kondou, Hiroshima (JP); Ippei Yamauchi, Hiroshima (JP)

(73) Assignees: MITSUBA Corporation, Gunma (JP); MAZDA MOTOR CORPORATION, Hiroshima (JP)

( * ) Notice: Subject to any disclaimer, the term of this patent is extended or adjusted under 35 U.S.C. 154(b) by 661 days.

(21) Appl. No.: 17/426,641

(22) PCT Filed: Nov. 24, 2020

(86) PCT No.: PCT/JP2020/043583
§ 371 (c)(1),
(2) Date: Jul. 29, 2021

(87) PCT Pub. No.: WO2021/106836
PCT Pub. Date: Jun. 3, 2021

(65) Prior Publication Data
US 2022/0135004 A1    May 5, 2022

(30) Foreign Application Priority Data
Nov. 25, 2019 (JP) .................................. 2019-211931

(51) Int. Cl.
*B60S 1/08* (2006.01)
*B60S 1/04* (2006.01)

(52) U.S. Cl.
CPC ........... *B60S 1/0807* (2013.01); *B60S 1/0402* (2013.01); *B60S 1/0452* (2013.01); *B60S 1/08* (2013.01)

(58) Field of Classification Search
CPC ...... B60S 1/0803; B60S 1/0807; B60S 1/166; B60S 1/0452; B60S 1/0402; B60S 1/3413; B60S 1/3418
(Continued)

(56) References Cited

U.S. PATENT DOCUMENTS 6,249,098 B1 *   6/2001   Miyazaki .................. B60S 1/08
                                                        318/443
2010/0037416 A1   2/2010   Amagasa et al.
(Continued)

FOREIGN PATENT DOCUMENTS

| JP | S60174348 | 9/1985 |
| JP | S6280743  | 5/1987 |

(Continued)

OTHER PUBLICATIONS

Machine translation of description portion of JP2009248650, published Oct. 2009. (Year: 2009).*
(Continued)

*Primary Examiner* — Gary K. Graham
(74) *Attorney, Agent, or Firm* — JCIPRNET

(57) ABSTRACT

A wiper control method and a wiper control device are provided. An arm falling position for stopping wiper arms for a predetermined time is set above a lower reversal position. When the wiper arms stopped on the side of an upper reversal position with respect to the arm falling position, such as a service position, are moved to a storage position set below the lower reversal position, or when a wiping operation is to be performed again, the wiper arms are temporarily stopped for the predetermined time at the (Continued)

arm falling position. Then, after the predetermined time elapses, the wiper arms are moved to the storage position in the case of a storage operation, and moved to the upper reversal position in the case of restarting, and then the normal wiping operation is performed.

4 Claims, 5 Drawing Sheets

(58) Field of Classification Search
USPC .................................... 15/250.16, 250.17
See application file for complete search history.

(56) References Cited

U.S. PATENT DOCUMENTS

| | | | |
|---|---|---|---|
| 2013/0081221 A1* | 4/2013 | Amagasa | B60S 1/08 15/250.01 |
| 2018/0086310 A1* | 3/2018 | Gage | B60S 1/0866 |
| 2018/0170315 A1 | 6/2018 | Matsuura et al. | |

FOREIGN PATENT DOCUMENTS

| | | |
|---|---|---|
| JP | H0930374 | 2/1997 |
| JP | 2008207701 X | 9/2008 |
| JP | 2009248650 | 10/2009 |
| JP | 2010159044 | 7/2010 |
| JP | 2017087831 | 5/2017 |

OTHER PUBLICATIONS

Machine translation of description portion of JPH0930374, published Feb. 1997. (Year: 1997).*

"Search Report of Europe Counterpart Application", issued on Nov. 24, 2023, pp. 1-8.

"International Search Report (Form PCT/ISA/210) of PCT/JP2020/043583," mailed on Jan. 19, 2021, with English translation thereof, pp. 1-4.

"Office Action of China Counterpart Application", issued on Dec. 1, 2023, with English translation thereof, pp. 1-15.

* cited by examiner

WIPER CONTROL METHOD AND WIPER CONTROL DEVICE

CROSS-REFERENCE TO RELATED APPLICATION

This application is a 371 application of the international PCT application serial no. PCT/JP2020/043583, filed on Nov. 24, 2020, which claims the priority benefits of Japan application no. 2019-211931, filed on Nov. 25, 2019. The entirety of each of the above-mentioned patent applications is hereby incorporated by reference herein and made a part of this specification.

TECHNICAL FIELD

The invention relates to a technique of controlling a wiper device for a vehicle, and particularly relates to operation control of a wiper device installed on a windshield of an automobile.

DESCRIPTION OF RELATED ART

In a control wiper that controls a wiper operation by detecting the position and moving speed of a wiper blade, the stop positions such as upper and lower reversal positions can be set as desired through control of a wiper motor. Therefore, in recent years, in luxury cars, an increasing number of automobiles have specifications for setting a storage position to a position where the wiper blade and the wiper arm (hereinafter, abbreviated as wiper blade, etc. where appropriate) are hidden under an engine hood (bonnet), and stopping the wiper blade, etc. there. In this case, the wiper blade, etc. is arranged in the storage position set below the lower reversal position when the wiper is not in use, and performs wiper operations such as LO (low speed), HI (high speed), and INT (intermittent) according to a wiper switch operation of a driver.

For a wiper device, it may be necessary to replace the wiper blade due to aged deterioration of blade rubber. However, in the case of a wiper device with the wiper blade, etc. stored under the engine hood (fully concealed type), at the storage position, the wiper arm cannot be raised (locked back) to replace the blade. Therefore, in such a wiper device, a position called a service position is provided near the upper reversal position where the wiper arm can be locked back, and after the wiper arm is moved there, the wiper arm is locked back to replace the wiper blade.

RELATED ART

Patent Document

[Patent Document 1] Japanese Patent Laid-Open No. 2017-87831

SUMMARY

Problems to be Solved

However, after replacing the wiper blade at the service position, it is possible that the storage operation of the wiper may be inadvertently performed without returning the wiper arm to the original position. In that case, for the fully concealed type wiper device, if the wiper arm that remains locked back returns near the lower reversal position, there may be interference with an end of the engine hood. If the wiper arm in the locked back state interferes with the engine hood, the wiper arm may fall down and the wiper blade may fall to the windshield so that it is twisted as the wiper arm moves. If the wiper blade falls down in a twisting manner and comes into contact with the glass in this way, a hard part of a cap attached to the tip of the wiper blade may hit the glass, and the impact may damage the windshield.

The invention is to operate the wiper arm that remains in the locked back state in the wiper operation after replacement of the wiper blade, and prevent the wiper blade from falling down together with the wiper arm and coming into contact with the windshield to damage the glass.

Means for Solving the Problems

A wiper control method according to the invention is a method for controlling a wiper device including: a wiper blade which is placed on a windshield of a vehicle; and a wiper arm to which the wiper blade is attached and which is reciprocally driven between an upper reversal position and a lower reversal position set on the windshield. The wiper control method includes: setting a stop position for stopping the wiper arm for a predetermined time above the lower reversal position, and when moving the wiper arm stopped on an upper reversal position side with respect to the stop position to a storage position set below the lower reversal position, temporarily stopping the wiper arm at the stop position for the predetermined time, and moving the wiper arm to the storage position after the predetermined time elapses.

In the invention, when the wiper arm stopped on the upper reversal position side with respect to the stop position is moved to the storage position, the wiper arm is temporarily stopped at the stop position for the predetermined time. Then, after the predetermined time elapses, the wiper arm is moved to the storage position. As a result, even if the wiper arm in the locked back state is stored in this state, since the wiper arm is temporarily stopped at the stop position, the wiper arm and the wiper blade safely return to the windshield there, and return to the storage position in the normal state. Therefore, even if the wiper arm is stored in the locked back state, the wiper arm does not interfere with the engine hood and does not fall to the windshield so that the wiper blade is twisted as the arm moves, and the windshield can be prevented from being damaged by the cap at the tip of the wiper blade.

In the wiper control method, the stop position may be located on a lower reversal position side with respect to a center position of the windshield, and when the wiper arm is stopped at the upper reversal position or between the center position and the upper reversal position, the wiper arm may be moved from a currently stopped position to the stop position, and moved to the storage position after the predetermined time elapses. In this case, a service position for locking back the wiper arm may be set at the upper reversal position or between the center position and the upper reversal position, and the wiper arm may be stopped at the service position.

Further, the stop position may be located on a lower reversal position side with respect to a center position of the windshield, and when the wiper arm is stopped between the center position of the windshield and the lower reversal position, the wiper arm may be temporarily moved from a currently stopped position to the upper reversal position, then moved from the upper reversal position to the stop position, and moved to the storage position after the predetermined time elapses.

Another wiper control method according to the invention is a method for controlling a wiper device including: a wiper blade which is placed on a windshield of a vehicle; and a wiper arm to which the wiper blade is attached and which is reciprocally driven between an upper reversal position and a lower reversal position set on the windshield. The wiper control method includes: setting a stop position for stopping the wiper arm for a predetermined time above the lower reversal position, and when restarting the wiper arm stopped on an upper reversal position side with respect to the stop position, temporarily stopping the wiper arm at the stop position for the predetermined time, moving the wiper arm to the upper reversal position after the predetermined time elapses, and then performing a reciprocating wiping operation between the upper reversal position and the lower reversal position.

In the invention, when the wiper arm stopped on the upper reversal position side with respect to the stop position is restarted, the wiper arm is temporarily stopped at the stop position for the predetermined time. Then, after the predetermined time elapses, the wiper arm is moved to the upper reversal position, and thereafter the reciprocating wiping operation is performed between the upper reversal position and the lower reversal position. As a result, even if the wiper arm in the locked back state is restarted in this state, since the wiper arm is temporarily stopped at the stop position, the wiper arm and the wiper blade safely return to the windshield there, then move to the upper reversal position, and then return to the normal wiping operation. Therefore, even if the wiper arm is operated in the locked back state, the wiper arm does not interfere with the engine hood and does not fall to the windshield so that the wiper blade is twisted as the arm moves, and the windshield can be prevented from being damaged by the cap at the tip of the wiper blade.

In the wiper control method, the stop position may be located on a lower reversal position side with respect to a center position of the windshield, and when the wiper arm is stopped at the upper reversal position or between the center position and the upper reversal position, the wiper arm may be moved from a currently stopped position to the stop position, moved to the upper reversal position after the predetermined time elapses, and then the reciprocating wiping operation may be performed between the upper reversal position and the lower reversal position. In this case, a service position for locking back the wiper arm may be set at the upper reversal position or between the center position and the upper reversal position, and the wiper arm may be stopped at the service position.

Further, the stop position may be located on a lower reversal position side with respect to a center position of the windshield, and when the wiper arm is stopped between the center position of the windshield and the lower reversal position, after the wiper arm is temporarily moved from a currently stopped position to the upper reversal position, the wiper arm may be moved from the upper reversal position to the stop position, the wiper arm may be moved to the upper reversal position after the predetermined time elapses, and then the reciprocating wiping operation may be performed between the upper reversal position and the lower reversal position.

Further, in the wiper control method described above, an arm falling position at which the wiper arm in a locked back state falls without contacting an engine hood of the vehicle and the wiper blade contacts the windshield may be set as the stop position.

Furthermore, a wiper control device according to the invention controls an operation of a wiper device including: a wiper blade which is placed on a windshield of a vehicle; a wiper arm to which the wiper blade is attached and which is reciprocally driven between an upper reversal position and a lower reversal position set on the windshield; a wiper motor which drives the wiper arm; and a wiper switch which switches an operation mode of the wiper arm. The wiper control device includes: a wiper switch detection portion which detects an operating state of the wiper switch; a wiper position detection portion which recognizes a current position of the wiper arm based on a signal from a position detection sensor which detects a position of the wiper arm; an arm operation determination portion which determines an operation control state of the wiper arm based on the operating state of the wiper switch and the current position of the wiper arm; and a motor operation instruction portion which operates the wiper motor based on determination of the arm operation determination portion, wherein the arm operation determination portion sets a stop position for stopping the wiper arm for a predetermined time above the lower reversal position, and when moving the wiper arm stopped on an upper reversal position side with respect to the stop position to a storage position set below the lower reversal position, temporarily stops the wiper arm at the stop position for the predetermined time, and moves the wiper arm to the storage position after the predetermined time elapses.

In the invention, when the wiper arm stopped on the upper reversal position side with respect to the stop position is moved to the storage position, the arm operation determination portion temporarily stops the wiper arm at the stop position for the predetermined time. Then, after the predetermined time elapses, the wiper arm is moved to the storage position. As a result, even if the wiper arm in the locked back state is stored in this state, since the wiper arm is temporarily stopped at the stop position, the wiper arm and the wiper blade safely return to the windshield there, and return to the storage position in the normal state. Therefore, even if the wiper arm is stored in the locked back state, the wiper arm does not interfere with the engine hood and does not fall to the windshield so that the wiper blade is twisted as the arm moves, and the windshield can be prevented from being damaged by the cap at the tip of the wiper blade.

In the wiper control device, the stop position may be located on a lower reversal position side with respect to a center position of the windshield, and when the wiper arm is stopped at the upper reversal position or between the center position and the upper reversal position, the arm operation determination portion may move the wiper arm from a currently stopped position to the stop position, and move the wiper arm to the storage position after the predetermined time elapses. In this case, a service position for locking back the wiper arm may be set at the upper reversal position or between the center position and the upper reversal position, and the wiper arm may be stopped at the service position.

Further, the stop position may be located on a lower reversal position side with respect to a center position of the windshield, and when the wiper arm is stopped between the center position of the windshield and the lower reversal position, the arm operation determination portion may temporarily move the wiper arm from a currently stopped position to the upper reversal position, then move the wiper arm from the upper reversal position to the stop position, and move the wiper arm to the storage position after the predetermined time elapses.

Another wiper control device according to the invention controls an operation of a wiper device including: a wiper blade which is placed on a windshield of a vehicle; a wiper arm to which the wiper blade is attached and which is reciprocally driven between an upper reversal position and a lower reversal position set on the windshield; a wiper motor which drives the wiper arm; and a wiper switch which switches an operation mode of the wiper arm. The wiper control device includes: a wiper switch detection portion which detects the operating state of the wiper switch; a wiper position detection portion which recognizes a current position of the wiper arm based on a signal from a position detection sensor which detects a position of the wiper arm; an arm operation determination portion which determines an operation control state of the wiper arm based on the operating state of the wiper switch and the current position of the wiper arm; and a motor operation instruction portion which operates the wiper motor based on determination of the arm operation determination portion, wherein the arm operation determination portion sets a stop position for stopping the wiper arm for a predetermined time above the lower reversal position, and when restarting the wiper arm stopped on an upper reversal position side with respect to the stop position, temporarily stops the wiper arm at the stop position for the predetermined time, moves the wiper arm to the upper reversal position after the predetermined time elapses, and then performs a reciprocating wiping operation between the upper reversal position and the lower reversal position.

In the invention, when the wiper arm stopped on the upper reversal position side with respect to the stop position is restarted, the arm operation determination portion temporarily stops the wiper arm at the stop position for the predetermined time. Then, after the predetermined time elapses, the wiper arm is moved to the upper reversal position, and thereafter the reciprocating wiping operation is performed between the upper reversal position and the lower reversal position. As a result, even if the wiper arm in the locked back state is restarted in this state, since the wiper arm is temporarily stopped at the stop position, the wiper arm and the wiper blade safely return to the windshield there, then move to the upper reversal position, and then return to the normal wiping operation. Therefore, even if the wiper arm is operated in the locked back state, the wiper arm does not interfere with the engine hood and does not fall to the windshield so that the wiper blade is twisted as the arm moves, and the windshield can be prevented from being damaged by the cap at the tip of the wiper blade.

In the wiper control device, the stop position may be located on a lower reversal position side with respect to a center position of the windshield, and when the wiper arm is stopped at the upper reversal position or between the center position and the upper reversal position, the arm operation determination portion may move the wiper arm from a currently stopped position to the stop position, move the wiper arm to the upper reversal position after the predetermined time elapses, and then perform the reciprocating wiping operation between the upper reversal position and the lower reversal position. In this case, a service position for locking back the wiper arm may be set at the upper reversal position or between the center position and the upper reversal position, and the wiper arm may be stopped at the service position.

Further, the stop position may be located on a lower reversal position side with respect to a center position of the windshield, and when the wiper arm is stopped between the center position of the windshield and the lower reversal position, the arm operation determination portion, after temporarily moving the wiper arm from a currently stopped position to the upper reversal position, may move the wiper arm from the upper reversal position to the stop position, move the wiper arm to the upper reversal position after the predetermined time elapses, and then perform the reciprocating wiping operation between the upper reversal position and the lower reversal position.

Further, in the wiper control device described above, an arm falling position at which the wiper arm in a locked back state falls without contacting an engine hood of the vehicle and the wiper blade contacts the windshield may be set as the stop position.

Effects

In the wiper control method according to the invention, when the wiper arm stopped on the upper reversal position side with respect to the stop position is moved to the storage position, the wiper arm is temporarily stopped at the stop position for the predetermined time, and moved to the storage position after the predetermined time elapses. Even if the wiper arm is in the locked back state, the wiper arm is temporarily stopped at the stop position, where the wiper arm and the wiper blade safely return to the windshield and return to the storage position in the normal state. Therefore, even if the wiper arm is stored in the locked back state, the wiper arm does not interfere with the engine hood and does not fall to the windshield so that the wiper blade is twisted as the arm moves, and the windshield can be prevented from being damaged by the cap at the tip of the wiper blade.

In another wiper control method according to the invention, when the wiper arm stopped on the upper reversal position side with respect to the stop position is restarted, the wiper arm is temporarily stopped at the stop position for the predetermined time, and after the predetermined time elapses, the wiper arm is moved to the upper reversal position, and thereafter the reciprocating wiping operation is performed between the upper reversal position and the lower reversal position. Even if the wiper arm is in the locked back state, the wiper arm is temporarily stopped at the stop position, where the wiper arm and the wiper blade safely return to the windshield, then move to the upper reversal position, and then return to the normal wiping operation. Therefore, even if the wiper arm is operated in the locked back state, the wiper arm does not interfere with the engine hood and does not fall to the windshield so that the wiper blade is twisted as the arm moves, and the windshield can be prevented from being damaged by the cap at the tip of the wiper blade.

Further, the wiper control device according to the invention is provided with the arm operation determination portion which, when moving the wiper arm stopped on the upper reversal position side with respect to the stop position to the storage position, temporarily stops the wiper arm at the stop position for the predetermined time, and moves the wiper arm to the storage position after the predetermined time elapses. Even if the wiper arm is in the locked back state, the wiper arm is temporarily stopped at the stop position, where the wiper arm and the wiper blade safely return to the windshield and return to the storage position in the normal state. Therefore, even if the wiper arm is stored in the locked back state, the wiper arm does not interfere with the engine hood and does not fall to the windshield so that the wiper blade is twisted as the arm moves, and the windshield can be prevented from being damaged by the cap at the tip of the wiper blade.

Another wiper control device according to the invention is provided with the arm operation determination portion which, when restarting the wiper arm stopped on the upper reversal position side with respect to the stop position, temporarily stops the wiper arm at the stop position for the predetermined time, moves the wiper arm to the upper reversal position after the predetermined time elapses, and thereafter performs the reciprocating wiping operation between the upper reversal position and the lower reversal position. Even if the wiper arm is in the locked back state, the wiper arm is temporarily stopped at the stop position, where the wiper arm and the wiper blade safely return to the windshield, then move to the upper reversal position, and then return to the normal wiping operation. Therefore, even if the wiper arm is operated in the locked back state, the wiper arm does not interfere with the engine hood and does not fall to the windshield so that the wiper blade is twisted as the arm moves, and the windshield can be prevented from being damaged by the cap at the tip of the wiper blade.

DESCRIPTION OF THE EMBODIMENTS

Figure 1:
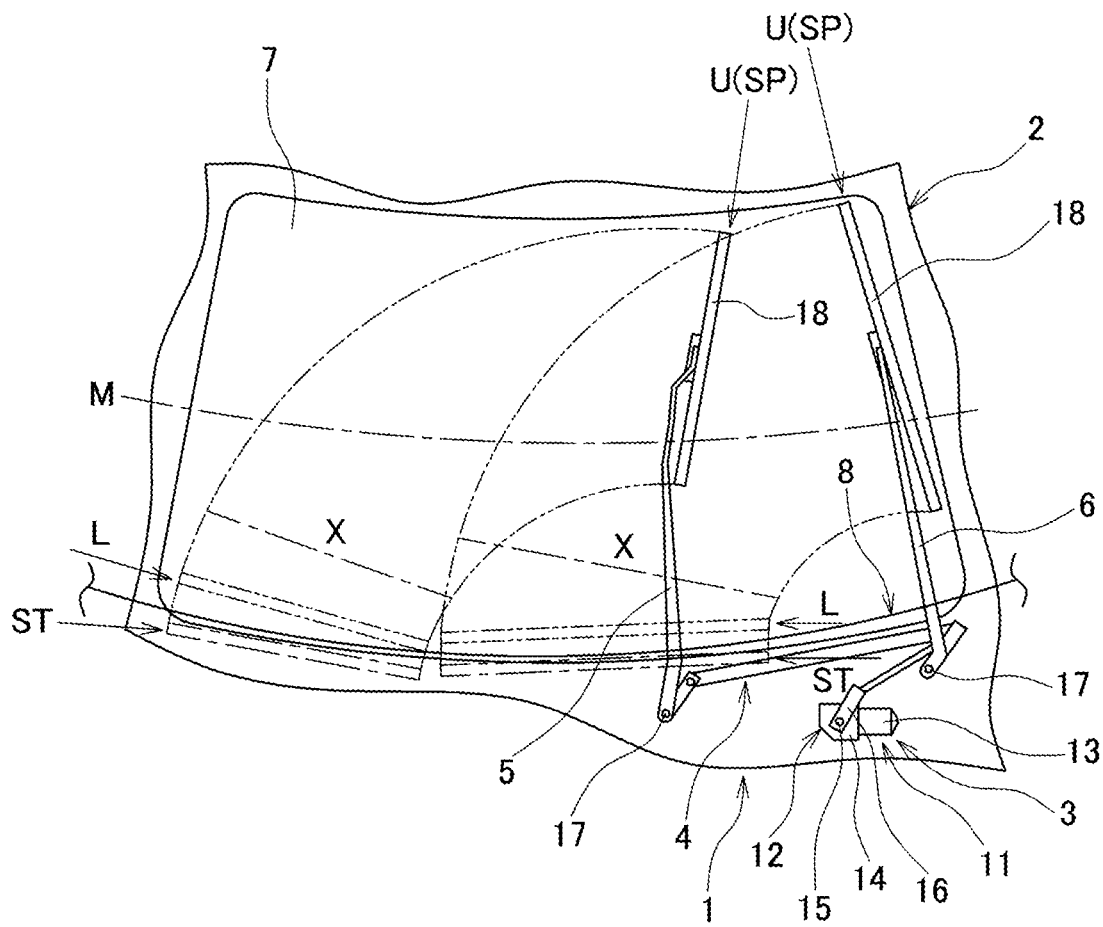
FIG. 1 is an explanatory diagram showing the configuration of a wiper device using a wiper control method and a wiper control device according to an embodiment of the invention.

Hereinafter, embodiments of the invention will be described in detail with reference to the drawings. FIG. 1 is an explanatory diagram showing the configuration of a wiper device using a wiper control method and a wiper control device according to an embodiment of the invention. As shown in FIG. 1, the wiper device 1 is mounted on an automobile (vehicle) 2 and driven by a wiper motor 3. The wiper motor 3 is connected to a pair of wiper arms 5 and 6 via a link mechanism 4. The wiper motor 3 has a motor body 11 and a deceleration mechanism portion 12 that decelerates and outputs the rotation of the motor body 11. The motor body 11 is composed of a DC (direct current) brush motor. In a motor housing 13 of the motor body 11, a field magnet and a brush (not shown) are fixed, and an armature including a commutator is rotatably housed. A brushless motor or another type of motor may be used as the wiper motor 3.

The deceleration mechanism portion 12 of the wiper motor 3 houses a worm gear that serves as a deceleration mechanism in a gear housing 14. A rotating shaft of the armature extending into the gear housing 14 is fixed to a worm. An output shaft 15 is fixed to a worm wheel that meshes with the worm. The output shaft 15 is drawn out of the gear housing 14 and connected to a crank arm 16. The crank arm 16 is connected to the link mechanism 4. The link mechanism 4 is formed with a pair of wiper shafts 17 as fulcrums, and by rotating the crank arm 16, swings the pair of wiper arms 5 and 6 with the wiper shafts 17 as fulcrums.

A wiper blade 18 is detachably attached to each of the wiper arms 5 and 6. The wiper blade 18 repressively brings rubber into contact with a windshield (front glass) 7 by a spring member mounted in the wiper arms 5 and 6. The wiper arms 5 and 6 perform a reciprocating wiping operation in a wiping area between an upper reversal position U and a lower reversal position L set on the windshield 7. In addition, when the wiper device 1 is not used, the wiper arms 5 and 6 and the wiper blades 18 are stopped and housed at a storage position ST set to be hidden under an engine hood 8. Further, the wiper device 1 is provided with a service position SP for replacing the wiper blade 18. The service position SP is provided near the upper reversal position U above a center position M of the windshield 7, but here the service position SP is set at the same position as the upper reversal position U.

Figure 2:
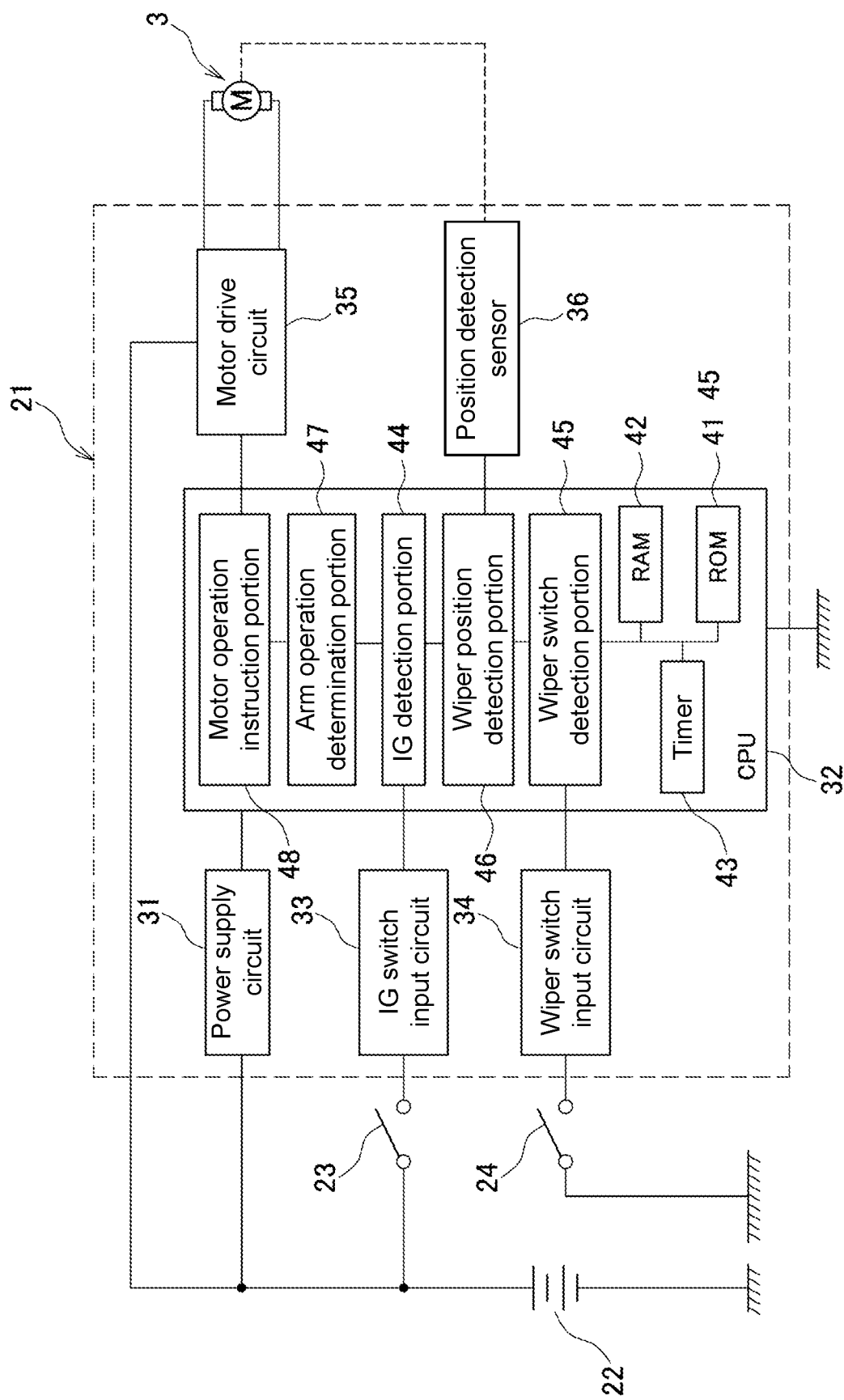
FIG. 2 is a block diagram showing the configuration of a wiper drive device.

A wiper drive device 21 for controlling the wiper device 1 is housed in the gear housing 14 of the deceleration mechanism portion 12. FIG. 2 is a block diagram showing the configuration of the wiper drive device 21, and the wiper drive device 21 is controlled by the control method according to the invention. As shown in FIG. 2, the wiper drive device 21 receives electric power supply from a power supply (battery) 22 and is electrically connected to an ignition switch 23 and a wiper switch 24 arranged in a vehicle compartment. The wiper switch 24 has LO, HI, and INT mode positions, and the wiper drive device 21 receives a switch operation of the driver to control the operation of the wiper motor 3, and operates the wiper arms 5 and 6 according to each mode.

The wiper drive device 21 includes a power supply circuit 31, a CPU (central processing unit: wiper control device) 32 which is a wiper control means, an IG (ignition) switch input circuit 33, a wiper switch input circuit 34, a motor drive circuit 35, and a position detection sensor 36. The power supply circuit 31 has a circuit configuration that converts a voltage of the power supply 22 into an operating voltage of the CPU 32. The CPU 32 has a ROM (Read Only Memory) 41, a RAM (Random Access Memory) 42, a timer 43, etc., and the ROM 41 stores programs and data for control.

The IG switch input circuit 33 outputs a signal to the CPU 32 when the IG switch 23 of the automobile 2 is turned ON. The wiper switch input circuit 34 outputs a signal corresponding to each mode to the CPU 32 when the wiper switch 24 is turned ON (LO, HI, INT). The motor drive circuit 35 has a switching element or the like, and controls energization to the wiper motor 3. The position detection sensor 36 is a sensor for detecting the position of the wiper blade 18 based on a motor rotation angle, and for example, a magnetoresistive sensor is used.

When a magnetoresistive sensor is used as the position detection sensor 36, a magnet for rotation detection in which the north and south poles are magnetized in the circumferential direction is provided on the output shaft 15 of the worm wheel of the deceleration mechanism portion 12, and the magnetoresistive sensor is arranged close to the magnet. When the wiper motor 3 is driven, the magnet for rotation detection also rotates with the rotation of the output shaft 15. The position detection sensor 36 outputs a signal each time the magnetic poles of the magnet for rotation detection are switched, and by processing this signal as data, the position of the wiper blade 18 is calculated and detected. A Hall IC or the like may be used as the position detection sensor 36.

In addition to the ROM 41, etc., the CPU 32 is further provided with an IG detection portion 44 that activates the CPU 32 by receiving a signal from the IG switch input circuit 33, a wiper switch detection portion 45 that detects the operating state of the wiper switch 24 by receiving a signal from the wiper switch input circuit 34, and a wiper position detection portion 46 that recognizes the current positions of the wiper arms 5 and 6 by receiving a signal from the position detection sensor 36. Further, an arm operation determination portion 47 that determines the operation control state of the wiper arms 5 and 6 based on the operating state of the wiper switch 24 and the current positions of the wiper arms 5 and 6, and a motor operation instruction portion 48 that gives an instruction to the motor drive circuit 35 to operate the wiper motor 3 based on the determination of the arm operation determination portion 47 are provided.

Figure 3:
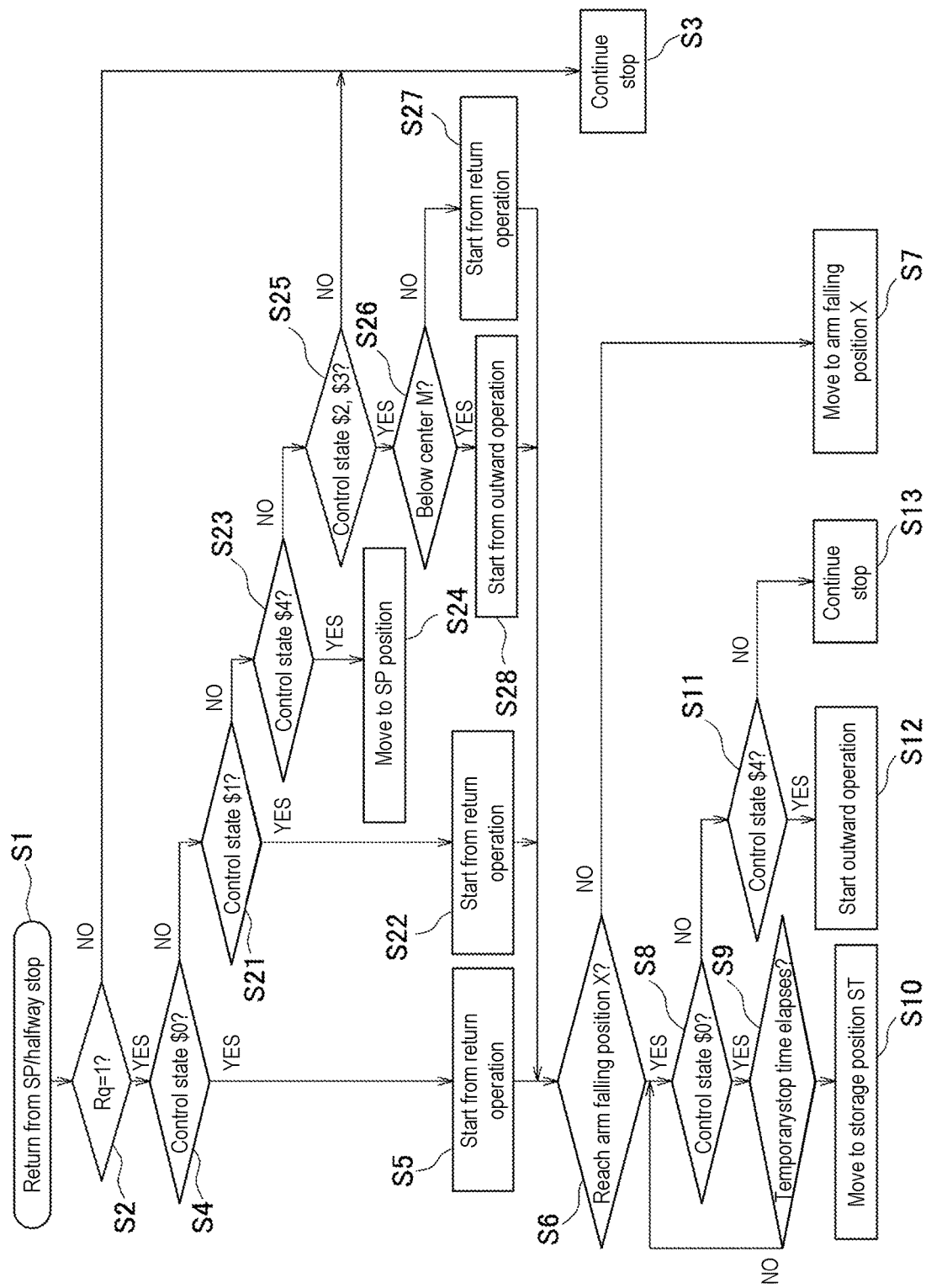
FIG. 3 is a flow chart showing the procedure of return control from a halfway stopped state in the wiper device of FIG. 1.
Figure 4:
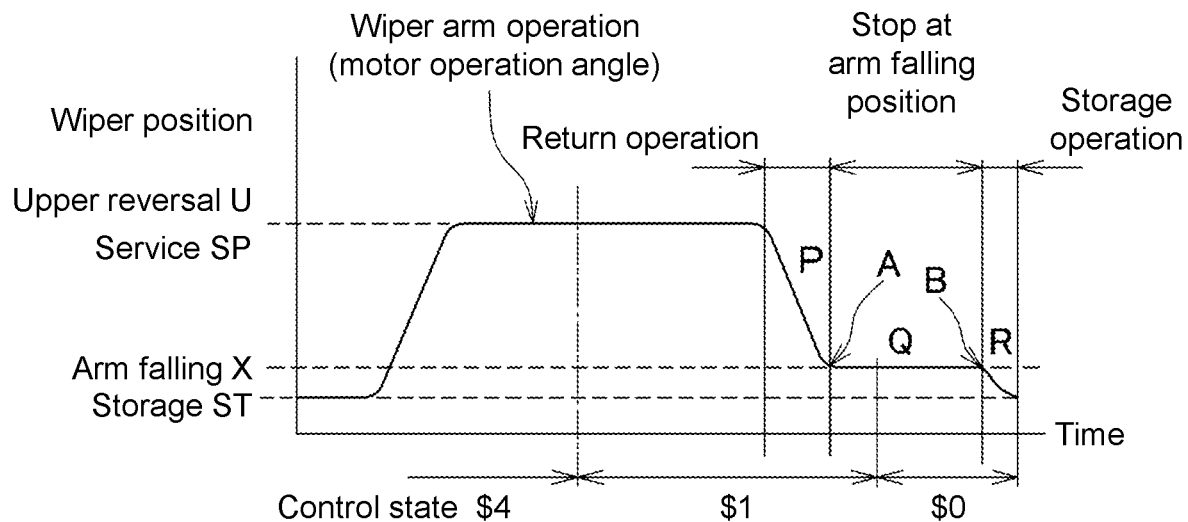
FIG. 4 is a time chart showing a wiper arm operation during return control, and shows a wiper arm operation when returning from a service position to a storage position.
Figure 5:
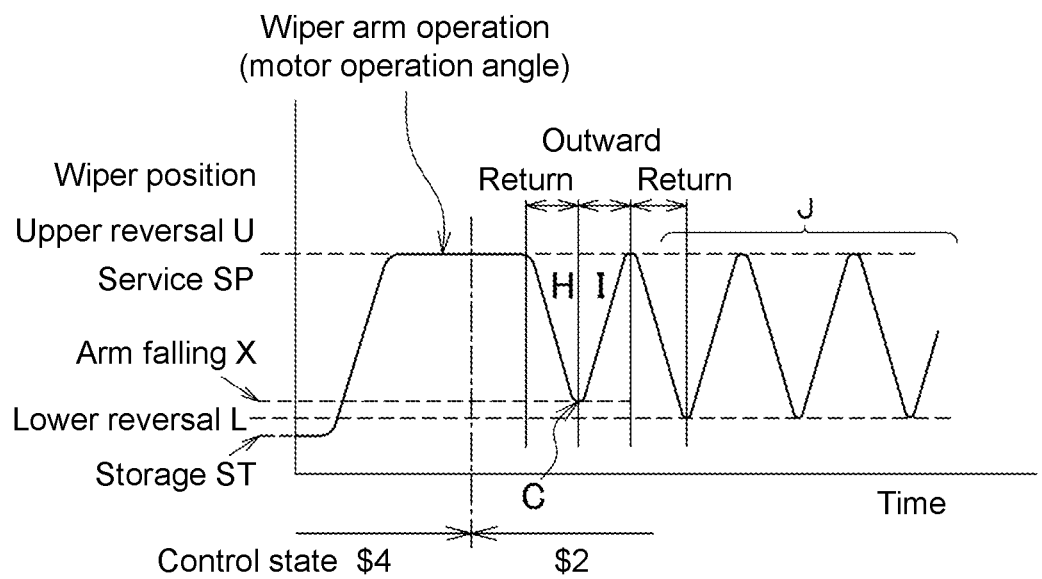
FIG. 5 is a time chart showing a wiper arm operation during return control, and shows a wiper arm operation when performing a wiping operation from the service position.
Figure 6:
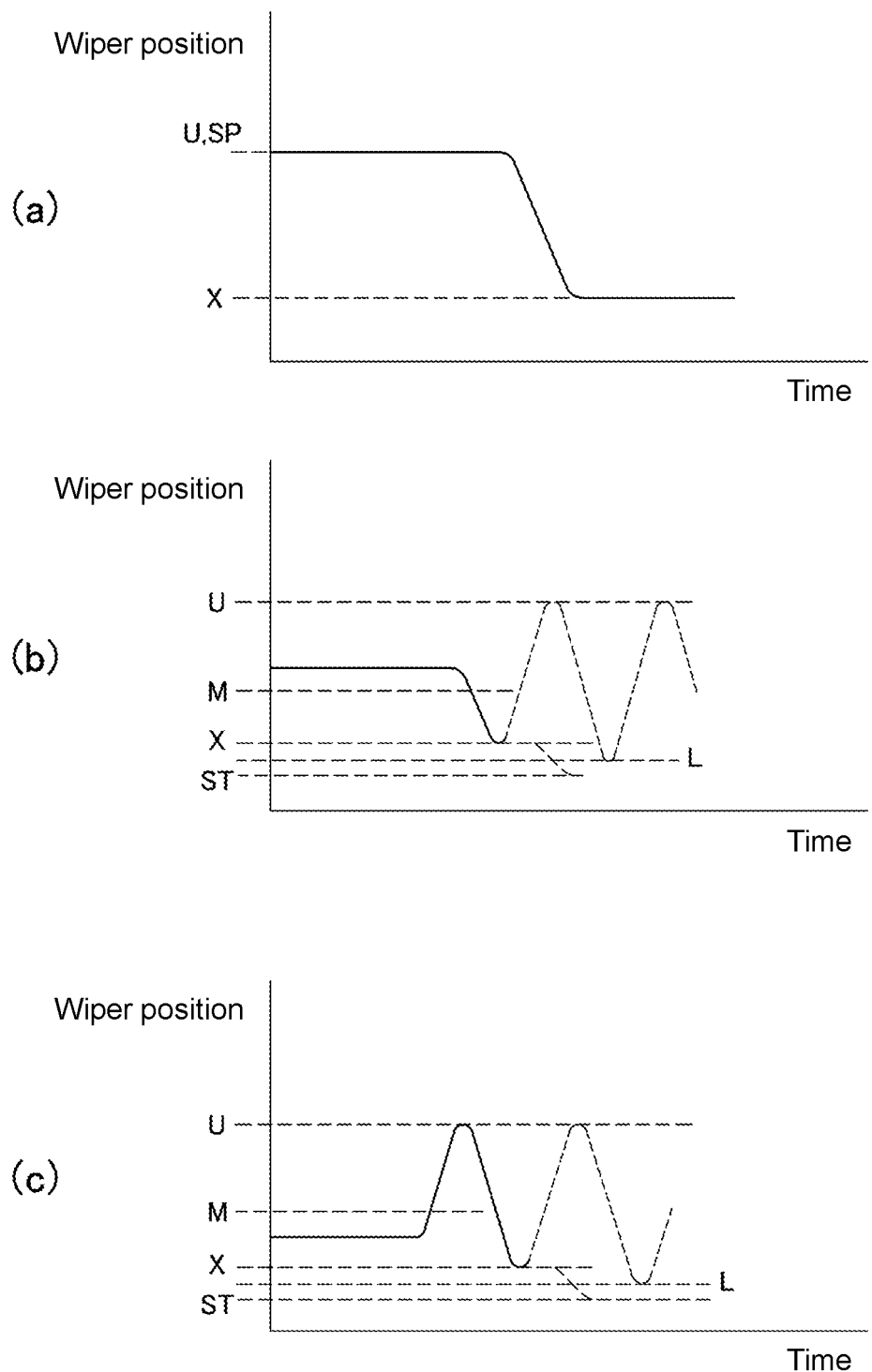
FIG. 6 is a time chart showing a wiper arm operation during return control, and shows a wiper arm operation when returning from a stop at a wiping halfway position.

Next, the operation of the wiper device 1 when the wiper arms 5 and 6 return from the state of stopping halfway in the wiping area will be described with reference to FIG. 3 to FIG. 6. Here, the control operation when returning from the service position SP to the storage position or starting the wiping operation after blade replacement will be mainly described. FIG. 3 is a flow chart showing the procedure of return control in the wiper device 1, and FIG. 4 to FIG. 6 are time charts showing the wiper arm operations during the return control of FIG. 3. The processing of FIG. 3 is performed by the judgment and determination of the arm operation determination portion 47 based on the programs and data for control stored in the ROM 41. FIG. 4 shows the wiper arm operation when returning from the service position SP to the storage position, FIG. 5 shows the wiper arm operation when performing the wiping operation from the service position SP, and FIG. 6 shows the wiper arm operation when returning from halfway stop, but the same control as in FIG. 4 and FIG. 5 is performed in the broken line part even when returning from the halfway stop in FIG. 6.

As shown in FIG. 3, when the return is started from the halfway stop (step S1: hereinafter, "step" is abbreviated as "S1" where appropriate), first, whether there is a restart start request (ReStart Rq) is judged by the wiper switch detection portion 45 (S2). The restart start request is "requested: Rq=1" when the wiper switch 24 is turned ON or when the mode is switched (for example, LO→HI). In S2, Rq=0 or 1 is confirmed, and when Rq=0 (no request), the processing proceeds to step S3, continuation of the stopped state of the wiper device 1 is determined by the arm operation determination portion 47, and a motor stop instruction is given from the motor operation instruction portion 48 to the motor drive circuit 35 to exit the routine. In contrast thereto, when Rq=1 (requested), the processing proceeds to step S4 or thereafter, and the restart control process from the halfway stop is started.

In step S4, the operation control state of the wiper device 1 (the state of the wiper switch 24 in S4) is confirmed by the wiper switch detection portion 45. In step S4, when the control state of the wiper switch 24 is $0 (storage instruction), the processing proceeds to step S5, otherwise the processing proceeds to step S21. When the operation control state is $0 in step S4, the processing proceeds to step S5, the arm operation determination portion 47 determines that the wiper operation is started from the return path operation, an instruction to that effect is given to the motor operation instruction portion 48, and the wiper arms 5 and 6 operate in the return path operation (the P part in FIG. 4). Then, the processing proceeds to step S6, and whether the wiper arms 5 and 6 reach the arm falling position (stop position) X is determined by the wiper position detection portion 46. When the wiper arms 5 and 6 do not reach the arm falling position X, the arm operation determination portion 47 proceeds to step S7, continues the return path operation, and moves the wiper arms 5 and 6 to the arm falling position X.

In this case, the arm falling position X refers to a position where the wiper arms 5 and 6 fall down due to their own weights when the wiper arms 5 and 6 move from the service position SP to the storage position side in the locked back state, and is below the center position M of the windshield 7. Even if the wiper arms 5 and 6 fall at this position, they do not interfere with the engine hood 8. And, if the wiper arms 5 and 6 stop at the arm falling position X, the arms fall in a way that the entire blade will hit the windshield 7, and therefore the hard part of the cap at the blade tip does not hit the glass. In other words, the arm falling position X is a position where no adverse effect is generated on the windshield 7 even if the wiper arms 5 and 6 in the locked back state fall down there.

When it is confirmed in step S6 that the wiper arms 5 and 6 reach the arm falling position X (the point A in FIG. 4), the processing proceeds to step S8, and the arm operation determination portion 47 confirms the operation control state of the wiper device 1 again based on the signal from the wiper switch detection portion 45 (whether or not the control state is $0). At that time, if the control state is $0, it is determined that the driver intends to store the wiper from the service position SP, and the processing proceeds to step S9 to temporarily stop the wiper arms 5 and 6 at the arm falling position X (the Q part in FIG. 4). In step S9, the stop time is clocked by the timer 43, and the wiper arms 5 and 6 stop on the spot for a predetermined time (about 1 to 2 seconds, here set to 1.5 seconds). Then, the stopped state is maintained while confirming the operation control state until the temporary stop time elapses (S9→S8→S9: the Q part in FIG. 4).

As described above, when the wiper arms 5 and 6 move from the service position SP (the side of the upper reversal position U) to the arm falling position X in the locked back state, the wiper arms 5 and 6 fall to the side of the windshield 7 there. Therefore, in the control according to the invention, when the wiper arms 5 and 6 come to the arm falling position X, the wiper arms 5 and 6 are temporarily stopped there to give a margin time for the wiper arms 5 and 6 to fall safely (insurance operation). Thus, even if the storage operation is performed in the locked back state, the wiper arms 5 and 6 fall at the arm falling position X without interfering with the engine hood 8, and the wiper blade 18 quietly and surely returns to the windshield 7 and moves to the storage position. Accordingly, even if the wiper arms 5 and 6 are stored in the locked back state from the service position SP, the wiper arms 5 and 6 do not interfere with the engine hood 8 and do not fall to the windshield so that the wiper blades are twisted as the arms move, and the windshield 7 can be prevented from being damaged by the cap at the tip of the wiper blade.

In step S9, the wiper arms 5 and 6 are temporarily stopped at the arm falling position X, and when the temporary stop time elapses while the control state is $0, the processing proceeds to step S10. At this time, the wiper arms 5 and 6 return to the normal state of being placed on the windshield 7 even if they are initially in the locked back state, and in step S10, the wiper arms 5 and 6 operate again in this state (the point B in FIG. 4) and move to the storage position (the R part in FIG. 4). Thus, in the control according to the invention, even if the wiper arms 5 and 6 are stored from the service position SP in the locked back state (or in the halfway stopped state at another position), they are temporarily stopped at the arm falling position X to safely return to the windshield 7 and return to the storage position in the normal state.

In contrast thereto, when the operation control state is other than $0 at the time of restarting from the service position SP or the halfway position, the following control operation is performed (FIG. 5).

[When the Operation Control State is Other than $0 in S8]

At the time of step S4, the control state $0 (temporarily stopped at the arm falling position X and stored) is selected, but after that, another control state ($2 to $4) is selected. In this case, the following six states are set as the control state of the wiper switch.

$0: The wiper arms 5 and 6 are temporarily stopped at the arm falling position X and stored.
$1: The wiper arms 5 and 6 are stopped at the arm falling position X.
$2: The wiper arms 5 and 6 are operated in LO.
$3: The wiper arms 5 and 6 are operated in HI.
$4: The wiper arms 5 and 6 are moved to the service position SP.
$5: The wiper arms 5 and 6 are stopped on the spot.

In step S8, when the operation control state of the wiper device 1 is other than $0, the driver initially intended to store the wiper from the service position SP, but after that, it is determined that another operation is selected, and the processing proceeds to step S11. In step S11, the current operation control state ($2 to $4) is determined. In step S11, when the operation control state is $2 to $4, the processing proceeds to step S12 to start the outward operation. In other words, the wiper arms 5 and 6 moving from the service position SP to the arm falling position X by the return operation (S5) (the H part in FIG. 5) are reversed in the operation direction at the arm falling position X (the point C in FIG. 5), and are operated outward and moved in the direction of the upper reversal position U (the I part in FIG. 5). In this case, the next operation is not the storage operation, and since interference with the engine hood 8 does not occur immediately afterward, the wiping operation and the movement to the service position SP are prioritized, and the wiper arms are not temporarily stopped at the arm falling position X, but are immediately reversed in the outward direction. However, here, reversing at the arm falling position X itself is an insurance operation, and the wiper arms 5 and 6 return to the windshield 7 at the arm falling position X and head toward the upper reversal position U.

As a result, the wiper arms 5 and 6 reach the upper reversal position U (here, the same position as the service position SP) in the normal wiping state, and then return to the normal wiping operation when the operation control state is $2 or $3 and stop at the service position SP when the operation control state is $4. In contrast thereto, in step S11, when the operation control state is not $2 to $4, for example, in the case of operation control states where the wiper arms 5 and 6 are stopped at the arm falling position X ($1) and the wiper arms 5 and 6 are stopped on the spot ($5), the processing proceeds to step S13, and the wiper arms 5 and 6 enter the state of being stopped at the arm falling position X.

Next, in step S4, when the operation control state is other than $0, the processing proceeds to step S21, and it is first confirmed whether the operation control state is $1. When the operation control state is $1, in order to move the wiper arms 5 and 6 to the arm falling position X, the processing proceeds to step S22 to start from the return operation, and the processing proceeds to step S6. Thereafter, when $1 is maintained, the processing proceeds from step S8 to S11→S13, and the wiper arms 5 and 6 stop at the arm falling position X ((a) of FIG. 6). When the operation control state changes from $1 to $0, the processing proceeds to step S9, and after temporarily stopping as described above, the wiper arms move to the storage position (S10).

In step S21, when the operation control state is other than $1, the processing proceeds to step S23, and it is confirmed whether the operation control state is $4. When the operation control state is $4, the processing proceeds to step S24, and when the wiper arms 5 and 6 are at the service position SP, they are kept that way, and when the wiper arms 5 and 6 are stopped halfway, the outward operation is performed and the wiper arms 5 and 6 are moved to the service position SP. In contrast thereto, when the operation control state is other than $4, the processing proceeds to step S25, and it is confirmed whether the operation control state is $2 (LO operation) or $3 (HI operation). When the operation control state is not $2 or $3, although the restart start request is made from the flow of steps S4→S21→S23→S25 (Rq=1), the operation control state is not $0 to $4 but $5, and the processing proceeds to step S3, and the stopped state of the wiper device 1 is continued.

In step S25, when the operation control state is $2 or $3, the processing proceeds to step S26, and it is determined whether the positions of the wiper arms 5 and 6 are above or below the windshield center M. In step S26, when the wiper arms 5 and 6 are above the windshield center M, since the arm falling position X is below the windshield center M, the processing proceeds to step S27, and the wiper arms 5 and 6 are started from the return operation and the processing proceeds to step S6 to move the wiper arms 5 and 6 to the arm falling position X ((b) of FIG. 6), and the processing after S6 is performed.

In contrast thereto, when the wiper arms 5 and 6 are below the center of the windshield, the processing proceeds to step S28 and the wiper arms 5 and 6 are started from the outward operation ((c) of FIG. 6). As described above, since the arm falling position X is below the windshield center M, when the wiper arms 5 and 6 are present below the windshield center position M, it is difficult to determine the positional relationship with the arm falling position X. Therefore, when the wiper arms 5 and 6 are operated in LO and HI after the restart start request from the halfway stop including the service position SP (Rq=1), after the wiper arms 5 and 6 are moved to the upper reversal position U once, the control after S6 is performed. The operations of S26 to S28 are control processes exclusively for cases when the wiper arms 5 and 6 stop at the wiping halfway position, and when the wiper arms 5 and 6 are at the service position SP, the operation of S28 is omitted and the processing proceeds to S6.

In this way, when wiping is started from the halfway stop, the first lower reversal position is the arm falling position X from the flow of S6→S8→S11→S12 from S27 and S28. That is, in the control according to the invention, even if the wiper arms 5 and 6 start wiping from the service position SP (or in the halfway stopped state at another position) in the locked back state, the first lower reversal position is the arm falling position X. Accordingly, the wiper arms 5 and 6 safely return to the windshield 7 at the arm falling position X, then move to the upper reversal position U, and return to the normal wiping operation. Therefore, when restarting from the locked back state, the situation that the wiper blade falls down to the windshield in a twisting manner to damage the windshield 7 can be prevented.

As described above, in the wiper device to which the invention is applied, even if the storage operation or wiping operation of the wiper arms 5 and 6 in the locked back state is performed from the halfway position of the wiping operation, such as the service position SP, which is on the side of the upper reversal position U with respect to the arm falling position X, the subsequent operations can be performed without damaging the windshield 7. In this case, in the storage operation, by temporarily stopping the wiper operation at the arm falling position X, the wiper arms 5 and 6 and the wiper blades 18 completely fall and then the wiper blades, etc. are stored, and the collision between the tip of the wiper blade and the windshield 7 is avoided to prevent damaging the windshield 7. Further, when the wiping operation is performed, by setting the first lower reversal position to the arm falling position X, the wiper arms 5 and 6 are directed toward the upper reversal position U while the wiper arms 5 and 6 and the wiper blades 18 fall safely, and then the normal wiping operation is performed, thereby avoiding the collision between the tip of the wiper blade and the windshield 7 to prevent damaging the windshield 7.

It goes without saying that the invention is not limited to the above-described embodiments, and various modifications can be made without departing from the gist of the invention.

That is, the above-described embodiment describes a phenomenon that when the wiper arm is in the locked back state during replacement of the wiper blade, the wiper arm in the locked back state interferes with the engine hood and falls down in the subsequent wiper operation. However, the invention is generally applicable when the wiper device is operated with the wiper arm locked back. For example, the invention is also applicable when the wiper device is operated while the wiper arm is set to the locked back state as a measure against snowfall.

Further, the above-described embodiment shows an example in which the service position SP is set to the same position as the upper reversal position U, but they may be set to different positions. For example, the service position SP may be set between the center position M and the upper reversal position U or at a position beyond the upper reversal position U. The center of the upper and lower reversal positions U and L (the center of the wiping area), instead of the center of the windshield 7, may be adopted as the center position M. In addition, the temporary stop time at the arm falling position X is not limited to 1 to 2 seconds and can be set as appropriate, and may be less than 1 second or more than 2 seconds. However, if the temporary stop time is too short, its significance as the insurance operation for safely falling the arm/blade is diminished, and if the temporary stop time is too long, it gives the driver a sense of redundancy, so about 1.5 seconds is preferable.

What is claimed is:

1. A wiper control device controlling an operation of a wiper device comprising:
    a wiper blade which is placed on a windshield of a vehicle;
    a wiper arm to which the wiper blade is attached and which is reciprocally driven between an upper reversal position and a lower reversal position set on the windshield;
    a wiper motor which drives the wiper arm; and
    a wiper switch which switches an operation mode of the wiper arm,
    the wiper control device comprising:
    a wiper switch detection portion which detects the operating state of the wiper switch;
    a wiper position detection portion which recognizes a current position of the wiper arm based on a signal from a position detection sensor which detects a position of the wiper arm;
    an arm operation determination portion which determines an operation control state of the wiper arm based on the operating state of the wiper switch and the current position of the wiper arm; and
    a motor operation instruction portion which operates the wiper motor based on determination of the arm operation determination portion,
    wherein the arm operation determination portion sets a stop position for stopping the wiper arm for a predetermined time above the lower reversal position, and when restarting the wiper arm stopped on an upper reversal position side with respect to the stop position, temporarily stops the wiper arm at the stop position for the predetermined time, moves the wiper arm to the upper reversal position after the predetermined time elapses, and then performs a reciprocating wiping operation between the upper reversal position and the lower reversal position;
    wherein the stop position is an arm falling position at which the wiper arm in a locked back state falls without contacting an engine hood of the vehicle, and the wiper blade contacts the windshield.

2. The wiper control device according to claim 1, wherein the stop position is located on a lower reversal position side with respect to a center position of the windshield, and
    when the wiper arm is stopped at the upper reversal position or between the center position and the upper reversal position,
    the arm operation determination portion moves the wiper arm from a currently stopped position to the stop position, moves the wiper arm to the upper reversal position after the predetermined time elapses, and then performs the reciprocating wiping operation between the upper reversal position and the lower reversal position.

3. The wiper control device according to claim 2, wherein a service position for locking back the wiper arm is set at the upper reversal position or between the center position and the upper reversal position, and
    the wiper arm is stopped at the service position.

4. The wiper control device according to claim 1, wherein the stop position is located on a lower reversal position side with respect to a center position of the windshield, and
    when the wiper arm is stopped between the center position of the windshield and the lower reversal position,
    the arm operation determination portion, after temporarily moving the wiper arm from a currently stopped position to the upper reversal position, moves the wiper arm from the upper reversal position to the stop position, moves the wiper arm to the upper reversal position after the predetermined time elapses, and then performs the reciprocating wiping operation between the upper reversal position and the lower reversal position.

* * * * *